UNITED STATES PATENT OFFICE 2,674,599

PHOSPHONIC ACID DERIVATIVES AND PROCESS FOR THE PRODUCTION THEREOF

Hans Suter, Dorflingen, Switzerland, assignor to Cilag Limited, Schaffhausen, Switzerland, a Swiss company No Drawing. Application October 31, 1950, Serial No. 193,301

11 Claims. (Cl. 260—270)

This invention relates to new phosphonic acid derivatives and processes for the production thereof. The present invention provides a series of new compounds of the general formula

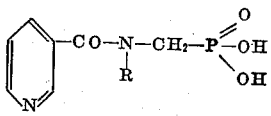

in which R is a substituent selected from the group consisting of a hydrogen atom, a lower alkyl, aryl and aralkyl radical, and salts of the said compounds with metals of biological importance.

I have found that compounds of this general formula have a stimulating action on the metabolism. They are capable of forming with the biologically important trace elements salts which are stable against oxidation and readily resorbable. Thus for example the iron, manganese, cobalt and copper salts are very suitable for remedying corresponding deficiency states.

All these compounds and their salts are distinguished by an excellent tolerance which enables them to be employed as effective fortifiers and tonics.

The said compounds and their heavy metal salts can be administered by mouth and can also be administered parenterally in the form of sodium and calcium salts.

The compounds can be produced by methods known per se.

The invention also provides two particularly advantageous processes for the manufacture of the above phosphonic acid derivatives.

According to one of these processes a compound containing the nicotinic acid radical, for example nicotinic acid, or the anhydride, a halide or an ester of nicotinic acid is reacted with compounds of the general formula

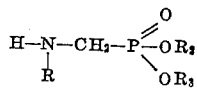

in which R represents hydrogen atom or an alkyl, aryl or aralkyl radical, R₂ and R₃ represent hydrogen atoms or radicals which can be converted into hydrogen atoms by hydrolysis or hydrogenolysis, and where necessary R₂ and R₃ are subsequently converted into hydrogen atoms.

According to the second process for the production of compounds of the above given general formula, a phosphorous trihalide is reacted with a compound of the general formula

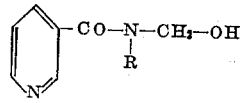

in which R represents a hydrogen atom or an alkyl, aryl or aralkyl radical and the corresponding halide of the formula

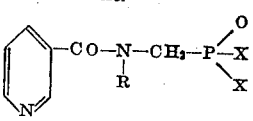

in which X represents a halogen atom, is reacted with water.

The relevant salts with heavy metals of biological importance can for example be produced by reacting a half equivalent of a bivalent heavy metal salt with a monoalkali salt of one of these phosphonic acids in aqueous solution, whereby salts are formed of the general formula

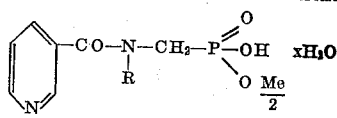

in which Me stands as a symbol for bivalent copper, iron, cobalt or manganese, and $x$ is an integer from zero to four.

The following examples show how the process of the invention may be carried into effect.

*Example 1*

74 gms. of nicotinic acid (0.6 mol) are fused at 245–250° C. and 44.4 gms. (0.4 mol) of aminomethylphosphonic acid are introduced. The whole is kept for 30 minutes at 250° C. Water mixed with a little pyridine escapes with initial strong foaming. After cooling the melt is pulverised and dissolved in 450 cc. of water and heated to boiling; charcoal is added and then filtered off. 1500 cc. of ethanol are added to the solution while still hot and the latter is then allowed to cool. The crude product which crystallises out is again recrystallised from water. In this way 52 gms. i. e. 56% of the theoretical quantity, of nicotinylaminomethylphosphonic acid are obtained. On working up the aqueous mother liquor a further 5 gms. of comparatively pure phosphonic acid are obtained which corresponds to an increase in the yield from 56 to 65% of the theoretical. The new phosphonic acid melts at 232–233° C. with decomposition, and has a solubility of 6% in cold water and of more than 50% in boiling water. It is only taken up very sparingly by the usual organic solvents. It crystallises with one mol of water of crystallisation which is not split off even by phosphorous pentoxide.

The acid constants are as follows:

pK₁, 3.7    pK₂, 6.6

Example 2

11.1 gms. of aminomethylphosphonic acid are suspended with 18.5 gms. of nicotinic acid in 60 cc. of decahydronaphthalene in a stirring apparatus. The mixture is boiled gently for 8 hours with stirring. Meanwhile the water of reaction distills off with a little decahydronaphthalene and is condensed in a downwardly inclined condenser. After cooling the reaction mass is filtered with suction from the decahydronaphthalene and the residue after washing with ether is dissolved in 50 cc. of water and 17 cc. of 30% sodium hydroxide. The aqueous solution is again extracted with ether to remove the remainder of the decahydronaphthalene, then acidified with 18 cc. of concentrated hydrochloric acid and charcoal is added and the mixture filtered hot. 3 times the quantity of methanol is added to the aqueous solution and the whole is cooled.

The crystallisate after reprecipitation from water gives 15.3 gms. of nicotinylaminomethylphosphonic acid which corresponds to a yield of 69% of the theoretical.

Example 3

52 gms. of nicotinic acid anhydride are melted and 44 gms. of aminomethylphosphonic acid are introduced. The mixture is heated with stirring for an hour to 190–200° C. After working up as described in Example 1, 68.5 gms. of nicotinyl-aminomethylphosphonic acid are obtained, which corresponds to a yield of 74% of the theoretical.

The N-nicotinylaminomethylphosphonic acid is also obtained by reacting nicotinic acid or nicotinic acid chloride with aminomethylphosphonic acid diphenolester and subsequent hydrolysis by diluted acetic acid, or by reacting nicotinic acid chloride with aminomethylphosphonic acid dibenzylester and subsequent hydrogenation with a palladium-charcoal catalyst.

Example 4

13 gms. of N-methylaminomethylphosphonic acid are mixed with 40 gms. of nicotinic acid anhydride and heated for 1½ hours to 200° C. Thereafter the hot melt is dissolved in 300 cc. of water, filtered and then allowed to cool. The mass which crystallises out, consisting of nicotinic acid, is filtered off with suction and the filtrate is evaporated to dryness. The residue is dissolved in methanol, filtered with charcoal, acetone is slowly added to the filtrate until crystallisation begins and the whole is then cooled. In this way N-nicotinyl-N-methylaminomethylphosphonic acid is obtained in a quantity of 20 gms. The new compound melts at 180–181° C. and dissolves very readily in water and acetic acid, sparingly in methanol and ethanol, and is insoluble in acetone, chloroform, petroleum ether and benzene. The acid constants are as follows:

pK₁, 3.8    pK₂, 7.0

Example 5

14 gms. of N-ethylaminomethylphosphonic acid are mixed with 34 gms. of nicotinic acid anhydride and heated for 1½ hours to 195° C. After cooling the melt is treated and purified in a similar manner as indicated in Example 4. One obtains the N-nicotinyl-N-ethylaminomethylphosphonic acid in a yield of 80% of the theoretical. The new compound melts at 161–162° C. and dissolves very readily in water and methanol, sparingly in acetic acid, and is insoluble in acetone, chloroform and petroleum ether and benzene. The acid constants are as follows:

pK₁, 3.7    pK₂, 7.2

Example 6

140 gms. of phosphorous trichloride are cooled to 0° C. in a round flask with stirring. 150 gms. of N-hydroxymethylnicotinic acid amide are introduced with continuous stirring whilst the temperature is maintained at 10° C.

After 45 minutes 100 cc. of acetic acid are allowed to flow in in a thin stream. The mixture is then stirred for 10 hours whilst cooling with water and the whole is then left by itself for 72 hours. Excess acetic acid and the phosphorous trichloride are then distilled off in vacuo until a bubbly foam forms. To this 150 cc. of water are carefully added and the whole is shaken until all is dissolved. From this solution the nicotinyl-aminomethylenephosphonic acid can be precipitated in the form of one of its heavy metal solutions and purified.

The following can be prepared in a manner analogous to that described in Example 6:

N-nicotinyl-N-methyl-amino-methyl-phosphonic acid from nicotinic acid-N-methyl-N-hydroxymethylamide and a phosphorous trihalide.

N-nicotinyl-N-ethyl-amino-methyl-phosphonic acid from nicotinic acid-N-ethyl-N-hydroxymethyl amide and a phosphorous trihalide.

The following can also be prepared by either of the processes already described:

N-nicotinyl-N-benzylaminomethylphosphonic acid. M. P.: 205–206° C.

N-nicotinyl-N-propylaminomethylphosphonic acid. M. P.: 152–153° C.

N-nicotinyl-N-phenylaminomethylphosphonic acid. M. P.: 214–215° C.

Example 7

The iron salt of nicotinylaminoethylphosphonic acid can be prepared as described below:

23.4 gms. of nicotinylaminomethylphosphonic acid are dissolved in 200 cc. of distilled water and 7.7 cc. of 49% by volume sodium hydroxide in a round flask with a stirrer and dropping funnel, all arranged to exclude air. 50 cc. of a 1 molar ferrous chloride solution are dropped in, the mixture is further stirred for 3 hours and allowed to stand for a few hours. The fine grained intense yellow precipitate is filtered off with suction, washed with water and then with ethanol and dried in vacuo at room temperature. 21 to 24 grams of the ferrous salt are obtained which correspond to a theoretical yield of 75–85%. The colbalt, manganese or copper salts are obtained in a high state of purity and in almost quantitative yields in the same way as the ferrous salt.

What I claim is:

1. The new chemical compound of the formula

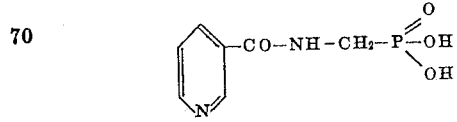

of melting point 232° C.

2. The iron salt of nicotinylaminomethylphosphonic acid of the formula

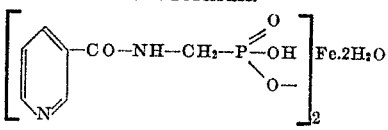

3. The cobalt salt of nicotinylaminomethylphosphonic acid of the formula

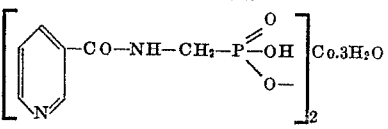

4. The new chemical compound of the formula

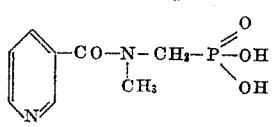

of melting point 180–181° C.

5. The new chemical compound of the formula

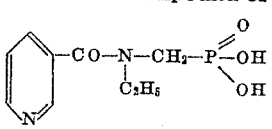

of melting point 161–162° C.

6. A process as claimed in claim 10 wherein nicotinic acid is heated with aminomethylphosphonic acid at 245–250° C., whereby N-nicotinyl-aminomethylphosphonic acid is obtained.

7. A process as claimed in claim 10, wherein nicotinic acid anhydride is heated with aminomethylphosphonic acid at 200° C., whereby N-nicotinyl-aminomethylphosphonic acid is obtained.

8. A process as claimed in claim 10, wherein nicotinic acid anhydride is heated with methylaminomethylphosphonic acid at 200° C., whereby N-nicotinyl-N-methyl-aminomethylphosphonic acid is obtained.

9. A process as claimed in claim 10, wherein nicotinic acid anhydride is heated with ethylaminomethylphosphonic acid at 195° C., whereby N-nicotinyl-N-ethylaminomethylphosphonic acid is obtained.

10. A process for the production of new phosphonic acid derivatives, comprising heating at 190–250° C. a compound selected from the group consisting of nicotinic acid, its anhydride, a halide and a lower alkyl of nicotinic acid with a compound of the general formula

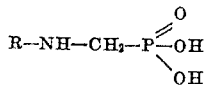

in which R is a substituent selected from the group consisting of a hydrogen atom, a lower alkyl, a phenyl radical, and a benzyl radical.

11. Compounds selected from the group consisting of phosphonic acids of the general formula

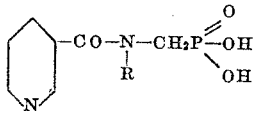

iron salts, manganese salts, copper salts, cobalt salts, and calcium salts of said acids, whereby R in the indicated formula is a substituent selected from the group consisting of hydrogen, a lower alkyl, a phenyl radical, and a benzyl radical.

References Cited in the file of this patent

UNITED STATES PATENTS

| Number | Name | Date |
|---|---|---|
| 2,136,501 | Hartmann et al. | Nov. 15, 1938 |
| 2,317,309 | Stenzl | Apr. 20, 1943 |

FOREIGN PATENTS

| Number | Country | Date |
|---|---|---|
| 596,230 | Great Britain | Dec. 31, 1947 |